United States Patent

[11] 3,614,484

[72] Inventor Andrew Shoh
 Ridgefield, Conn.
[21] Appl. No. 22,413
[22] Filed Mar. 25, 1970
[45] Patented Oct. 19, 1971
[73] Assignee Branson Instruments, Incorporated
 Stamford, Conn.

[54] ULTRASONIC MOTION ADAPTER FOR A MACHINE TOOL
 6 Claims, 3 Drawing Figs.
[52] U.S. Cl. ................................................. 310/8.2,
 51/59 SS, 77/5 R, 310/8.7, 310/26
[51] Int. Cl. ...................................................... H01v 7/00,
 H04r 17/00
[50] Field of Search .......................................... 173/90;
 51/59, 59 SS, 34, 34.7, 56; 77/5, 5 CB; 310/8.2,
 8.3, 8.7, 26

[56] References Cited
 UNITED STATES PATENTS
3,105,482 10/1963 Mieville ........................ 51/59 X
3,471,724 10/1969 Balamuth ..................... 310/26
3,482,360 12/1969 Legge ........................... 51/59 X Primary Examiner—D. F. Duggan
Assistant Examiner—Mark O. Budd
Attorney—Ervin B. Steinberg ABSTRACT: An ultrasonic motion adapter for a machine tool comprises two elongated coaxially disposed members coupled to each other with one of the members being adapted to oscillate as a half wavelength resonator at a predetermined frequency, typically at an ultrasonic frequency of 20 kHz. The adapter is designed to be removably coupled to a conventional machine tool and when so coupled causes a tool bit to rotate while undergoing axial oscillation at the predetermined frequency.

PATENTED OCT 19 1971 3,614,484

INVENTOR.
ANDREW SHOH

BY:
Ervin B. Steinberg

ULTRASONIC MOTION ADAPTER FOR A MACHINE TOOL

This patent application is related to copending U.S. application for U.S. Pat. Ser. No. 888,468 filed Dec. 29, 1969 entitled "Transducer for Ultrasonic Machine Tool."

This invention refers to ultrasonic machine tools such as are disclosed, for instance, in U.S. Pat. No. 3,015,914 entitled "Machine Tool," issued to R. N. Roney on Jan. 9, 1962, and in U.S. Pat. No. 3,482,360 entitled "Ultrasonic Machining Apparatus" issued to Percy Legge on Dec. 9, 1969. An Ultrasonic machine tool of this type includes generally an electromechanical transducer which is fitted at its output end with a tool bit adapted to operate on a workpiece. The tool bit, typically a drill or a diamond impregnated tool, is driven at a predetermined rotational speed while undergoing vibration in the axial direction. The axial vibration most commonly is at a frequency in excess of 16 kHz. such as 20 to 25 kHz., and is produced by the electromechanical transducer which includes piezoelectric or magnetostrictive means for providing mechanical vibration responsive to electrical excitation.

The constructions disclosed in the prior art are specialized machines which are rather heavy, bulky and cumbersome. In view of the recent development of high-stress metals and lightweight metal laminates, such as titanium and tungsten-boron laminates, the so-called ultrasonic machine tool has found increased interest and acceptance. These metals and laminates are difficult to machine without the assistance of the ultrasonic vibrations. However, the presently available ultrasonic machine tools do not lend themselves for drilling holes in situ as is required, for instance, when assembling aircraft wings or similar large structures. In these cases a portable drill device is usually employed and a long felt need has been an ultrasonic motion adapter which can be attached to a more or less standard portable machine tool, the adapter providing the high-frequency longitudinal vibration needed for more successfully operating on the materials stated heretofore. The device disclosed hereafter meets this very need and provides a ready means for converting a standard rotary tool to one which provides also the ultrasonic motion found so very helpful in machining hard and brittle materials.

Aside from meeting this long felt need, the adapter design disclosed hereafter capable of providing vibration in the ultrasonic frequency range is endowed with several other and most desirable features. The motion adapter includes an electromechanical transducer which is provided with precise and accurate concentric mounting means disposed at a location close to the output end which receives the tool bit adapted to operate on the workpiece. Furthermore, the transducer construction described and illustrated reveals good coaxial alignment between the resonant portion of the transducer and the supporting structure. One of the significant shortcomings of the prior arrangements has been the lack of concentricity, causing tool runout and preventing the machining of parts to close tolerances.

Other features of the ultrasonic motion adapter and of the transducer design disclosed hereafter comprise a high degree of rigidity and resistance to sideways thrust applied to the end of the transducer assembly, and improved ability to transmit torque and axial thrust as is necessary during a drilling or milling operation. Furthermore, the performance of the transducer disclosed is substantially unaffected by minor changes in the operating frequency. Finally, the transducer assembly is adapted to operate as a one-half wavelength resonator, thus maintaining an overall length of approximately 5 inches, using the typical metals most commonly used for the construction of ultrasonic transducer assemblies. This short length makes the device eminently suited as an adapter for standard stationary and portable machine tools.

One of the principal objects of this invention, therefore, is the provision of a new and improved ultrasonic motion adapter for standard machine tools.

Another important object of this invention is the provision of an ultrasonic motion adapter which may be coupled in a removable manner to a standard machine tool so as to convert a standard machine tool to one providing also ultrasonic vibrations.

Another important object of this invention is the provision of an ultrasonic motion adapter for a machine tool, the adapter being characterized by small dimensions and ability to maintain a high degree of accuracy, specifically small runout of the tool which undergoes rotation and axial vibration.

A further important object of this invention is the provision of an adapter which includes a coaxial electromechanical transducer assembly with diaphragm means for coupling the active resonating portion of the assembly to the supporting structure, and the diaphragm means being so located as to cause the forces transmitted therethrough to be in opposition.

A still further object of this invention is the provision of an electromechanical transducer assembly comprising a shaft, a sleeve in coaxial relationship with the shaft, electroacoustic excitation means coupled for setting said sleeve into resonance along its longitudinal direction, means for imparting rotation to said assembly and means for coupling a tool bit to said assembly, said tool bit being responsive to the rotation and longitudinal vibration.

Further and still other objects of this invention will be more clearly apparent by reference to the following description when taken in conjunction with the accompanying drawings, in which.

Figure 1:
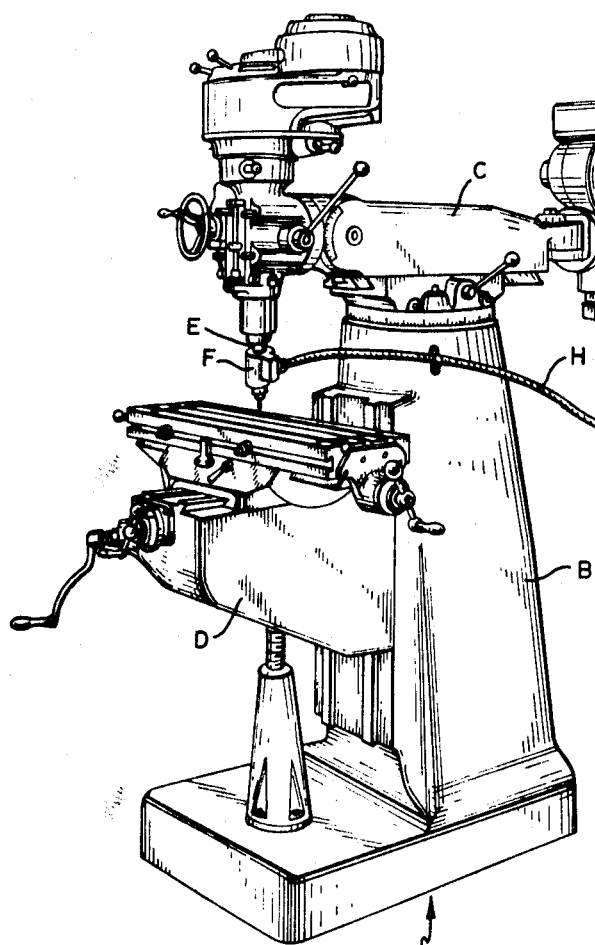
FIG. 1 is a perspective illustration of a typical machine tool, such as a milling machine, fitted with the ultrasonic motion adapter which forms the present invention.

Referring now to the figures and FIG. 1 in particular, letter A refers to a conventional milling machine tool having a base B which supports a crosshead C and a work-supporting table D. The milling machine has a rotating spindle E, driven in the usual manner, which is fitted with an ultrasonic motion adapter F. The adapter F receives electrical high-frequency excitation from a generator G via a cable H. The adapter F includes electroacoustic transducing means for converting the applied electrical excitation to mechanical vibration. By virtue of the ultrasonic motion adapter the tool bit operating on a workpiece when rotating is caused also to undergo axial vibration, most commonly at an ultrasonic frequency.

One of the salient characteristics of the present invention concerns the feature that the ultrasonic motion adapter F is a separate self-contained unit which is adapted to be removably coupled to and supported by a conventional machine tool, such as a "Bridgeport" milling machine illustrated in FIG. 1.

Figure 2:
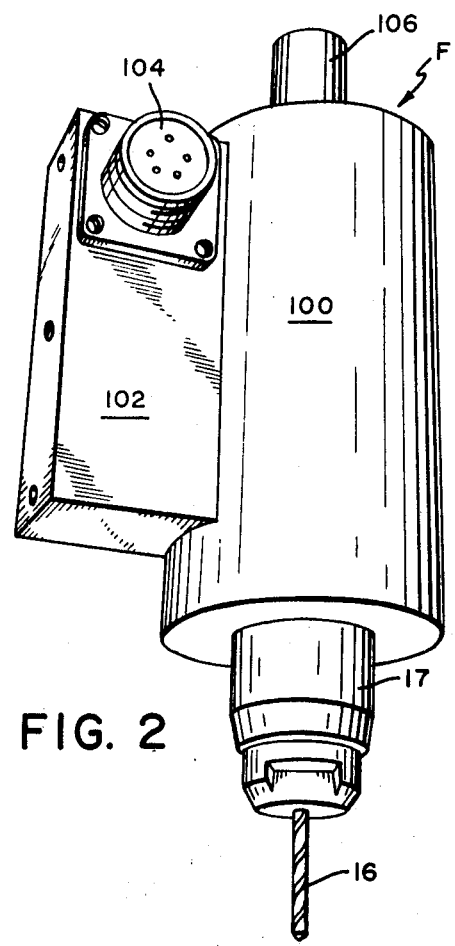
FIG. 2 is a perspective view of the ultrasonic motion adapter.

The appearance of the adapter F is illustrated still further in FIG. 2. The adapter F has a housing 100 which encloses the ultrasonic converter or transducer assembly which will be described in detail in conjunction with FIG. 3. An input end 106 in the form of an input shaft extends from the housing. This input end is adapted to be removably coupled to the chuck, collet or tapered aperture of the spindle of a standard machine tool and when so coupled the adapter F receives rotating motion. At the other end of the housing 100 there is disposed a chuck 17 which is fitted with a tool bit 16, such as a twist drill. The drill 16 is adapted to undergo rotational motion responsive to the rotation applied to the input end 106 and to undergo axial motion responsive to the electrical excitation from the generator G. Electrical energy is supplied via the cable H to the connector 104 mounted to the subhousing 102. The subhousing 102 supports an electrical slipring assembly.

A further most important feature of the present adapter construction concerns the support of the ultrasonic motion adapter on the machine tool A. It will be noted that the input end 106, FIG. 2, constitutes the sole support for holding and retaining the adapter F in operative relation with the machine tool A. This feature is a most significant advance in the art when considering the prior cumbersome and specially constructed apparatus for superimposing ultrasonic vibratory motion upon a rotary tool bit.

Figure 3:
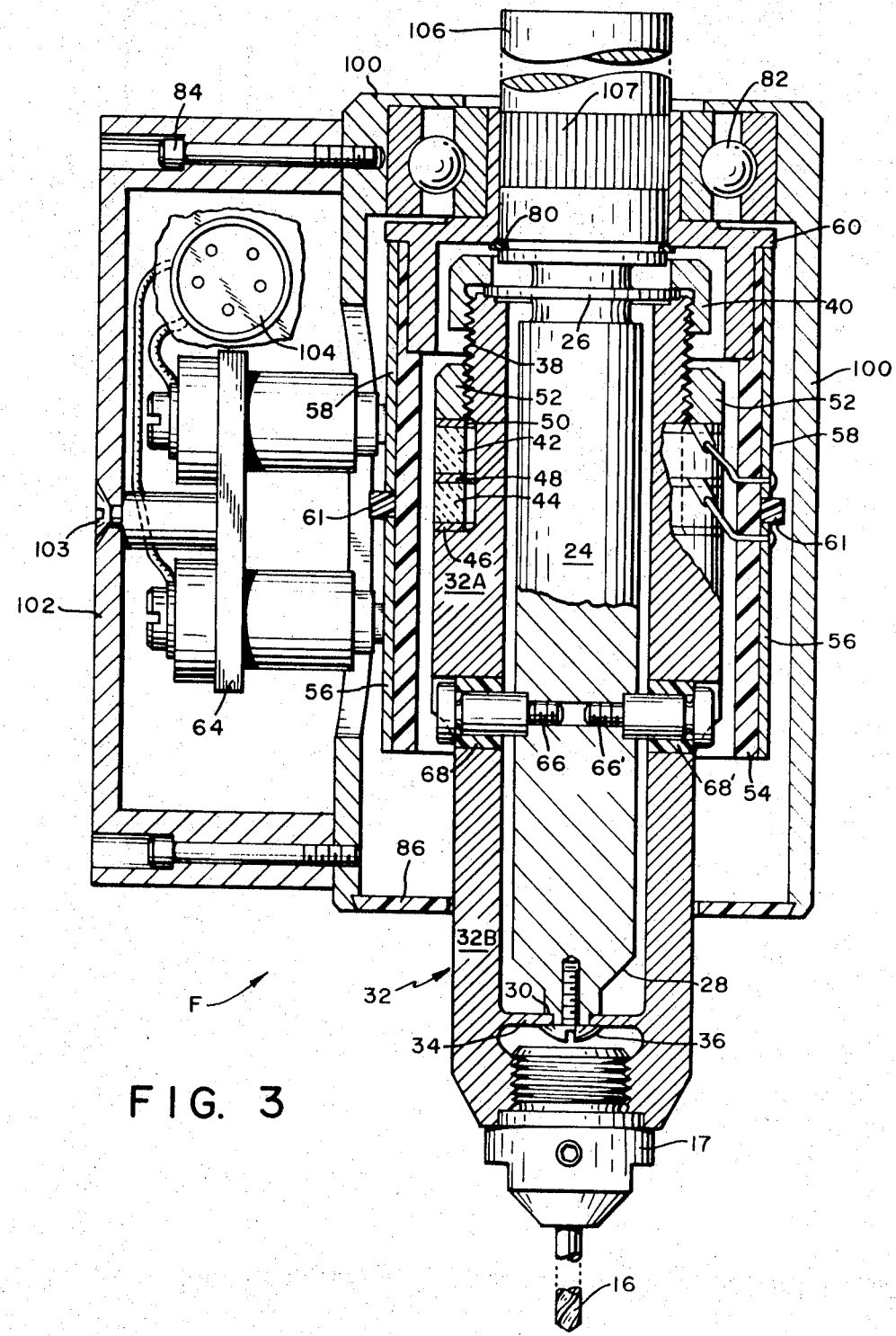
FIG. 3 is a cross-sectional view of the ultrasonic motion adapter, revealing the constructional features in greater detail.

The design of the ultrasonic motion adapter F which is adapted to be coupled to a standard machine tool is shown in detail in FIG. 3. With reference to this figure, numeral 24 identifies a metal shaft of elongate shape which by means of its input end 106 extending from the housing 100 is adapted to be coupled to the spindle E of the machine tool A (FIG. 1) to receive rotation therefrom. The shaft 24 is provided with a relatively thin diaphragm 26 in the form of a radially extending flange. At the lower end, the shaft 24 is beveled, as shown by numeral 28, and terminates in a stepped radial surface 30.

Concentric with the shaft 24 there is disposed a cylindrical metal sleeve 32 having an input upper section 32A and a lower output section 32B of reduced diameter. The sleeve 32 is adapted to resonate as half wavelength resonator at the frequency of sound travelling therethrough in the axial direction and the sleeve thereby is known also to form a solid horn, velocity transformer, mechanical impedance transformer or similar term, see for instance "Ultrasonic Engineering" (book) by Julian R. Frederick, John Wiley and Sons, Inc., New York, N.Y. (1965) pp. 87–103.

The sleeve is provided with an internally extending diaphragm 34 in the form of a radial flange. A screw 36 clamps the diaphragm 34 against the surface 30 of the shaft 24, thereby coupling the sleeve 32 to the shaft 24. At the opposite sleeve end, the sleeve 32 is provided with an external thread 38, and an internally threaded bushing 40 is threaded upon the thread 38 to couple and clamp the diaphragm 26 extending from the shaft 24 to the sleeve.

In order to set the sleeve into vibration there are provided two piezoelectric disk transducers 42 and 44, made typically of lead zirconate titanate material, which are in contact with a set of thin electrode disks 46, 48 and 50. An internally threaded bushing 52 is threaded upon the lower portion of thread 38 and is tightened to put the piezoelectric disks 42 and 44 under compression. The electrodes are connected via respective tabs and electrical conductors to an electrical slip ring assembly comprising a sleeve 54 of insulating material and two electrically conductive sliprings 56 and 58 separated by a ring 61 of insulating material. The sleeve 54 is press fitted upon a stepped bushing 60 which is press fitted upon a knurled portion 107 of the input end 106 of the shaft 24. An external snapring 80 disposed in a groove of the shaft portion 106 locates the bushing 60 in axial direction. An electrical brushholder 64 fastened to the subhousing 102 by means of a screw 103 contains two electrical brushes which establish contact with the respective sliprings. The electrical brushes, in turn, are connected via the connector 104 and cable H to the generator G (FIG. 1). The lower portion of the output end 32B of the sleeve 32 is provided also with an internal thread to receive a chuck 17 which retains the tool bit 16. While the sleeve and the shaft are coupled to each other at the diaphragms 26 and 34 by means of the screw 36 and the bushing 40, additional means may be provided to ensure the positive transfer of rotational force or torque between both coaxial members 24 and 32. To this end, a set of radially disposed shoulder screws 66 and 66' are arranged in the nodal region of the sleeve for locking the sleeve 32 to the shaft 24. The shoulder portions of the screws within the sleeve are covered by respective nylon bushings 68 and 68'. The screws, moreover, improve the transmission of axial thrust from the shaft 24 to the sleeve 32.

An antifriction bearing 82, such as a ball bearing, is pressed upon the upper cylindrical portion of stepped bushing 60 and the outer race of the bearing 82 is seated in an upper recess of the housing 100. Screws 84 mount the subhousing 102 supporting the stationary brush assembly 64 and connector 104 to the housing 100. A plastic disk 86 covers the lower end of the assembly.

It will be apparent that the bearing 82 permits the transducer assembly comprising the members 24 and 32 to rotate while the housing 100 and subhousing 102 remain stationary. Actually, the housing is what may be termed "free-floating." It has been bound that the cable H may be used to prevent the housing 100 from rotating.

Operation of the ultrasonic motion adapter F may be visualized as follows: The sleeve 32 and shaft 24 comprising the main active elements of the transducer are set into rotation in unison by rotation applied at the extending shaft portion 106. Upon energization of the generator G the piezoelectric disks 42 and 44 convert the applied electrical excitation to mechanical vibration. The transducer is so dimensioned that at the exciting frequency, typically 20 kHz., the sleeve 32 is resonant as a half wavelength longitudinal resonator whereby the diaphragms 26 and 34 are disposed substantially in the respective two proximate antinodal regions of the resonator. The antinodal regions are those regions exhibiting maximum longitudinal motion and substantially no motion in the radial direction. The thickness of the diaphragms is selected to permit a flexing or dishing of the diaphragms, for enabling the resonant sleeve 32 to elastically expand and contract in accordance with the applied frequency but prevent flexing in the radial direction. As the sleeve 32, shaft 24, sliprings 56 and bushing 60 rotate, the housing 100 and subhousing 102 stand still due to the interposition of the bearing 82. The longitudinal oscillations of the sleeve 32 are superimposed on the rotational motion provided at the shaft portion 106.

In view of the constructional features of the diaphragms and the fact that the diaphragms are disposed in the antinodal regions of the resonator and the absence thereat of radial motion as would exist if the support means were disposed in the nodal regions, accurate coaxial alignment between both elongate members is maintained during operation. Moreover, motion between both members is confined and restricted to that occurring along the longitudinal axis. This constitutes a significant feature and major difference over many prior art devices which largely employ coupling between the resonating portion and the nonresonating support portion of the transducer in the nodal region or nodal plane.

Another important feature of the present design resides in the feature that the forces transmitted by the diaphragms which couple the shaft and the sleeve to each other are equal and opposite, hence cancelling each other. This is achieved on account of the diaphragms 26 and 34 being spaced apart one-half wavelength of the vibration within the sleeve. Therefore, the diaphragms are urged to flex outward or inward in a like manner, but opposite direction.

Since the chuck 17 is coupled to the resonating sleeve 32, the tool bit 16 undergoes axial vibration while simultaneously being rotated responsive to rotation transmitted to the shaft 24 at the portion 106 by a standard machine tool, such as a milling machine, a drill, and the like.

The absence of complaint decoupling means imparts to the above-described transducer construction an exceptionally high degree of rigidity, resistance to sideways thrust and ability to transmit axial thrust for drilling operations. Moreover, the diaphragms 26 and 34 are frequency insensitive, that is, not tuned to or responsive to a specific frequency within the transducer operating range and, therefore, capable of accommodating changes in the operating frequency. It should be noted, furthermore, that the concentric mounting is provided at a location close to the tool bit 16, which feature substantially alleviates the heretofore existing problem of tool runout.

The shaft and sleeve preferably are made of such metals as aluminum or titanium commonly employed for transducer construction. The radially disposed screws 66 and 66' are disposed most suitably in the nodal region of the resonating sleeve 32 with the reduction in diameter of the sleeve 32 occurring in the same region. The dimensioning of vibrators for resonant frequency operation is described in detail in Julian R. Frederick supra.

It will be apparent to those skilled in the art that the construction revealed heretofore may, to some extent, be reversed. Specifically, the shaft can be provided with piezoelectric means and dimensioned to be resonant and mechanically coupled to the sleeve. In this case, the sleeve would be coupled to receive rotation from the machine tool spindle E and the tool bit 16 and chuck would be coupled to the shaft. The electrical connections from the slipring assembly would extend through the sleeve to the piezoelectric disks. This reversal or interchange of parts constitutes no departure from the principal features disclosed heretofore.

Moreover, instead of the piezoelectric means shown for converting electrical input to mechanical vibration, magnetostrictive means may be used without departing from the scope of the invention.

Whereas the above description indicates a typical operating frequency of 20 kHz., this value is not critical and the adapter may be dimensioned for operating in the high-frequency range from 1 to 100 kHz. It is believed, however, that best machining effects are achieved in the range from 16 to 40 kHz.

What is claimed is:

1. An ultrasonic motion adapter for a machine tool comprising:
    a housing enclosing a transducer assembly having electroacoustic transducing means for receiving electrical high-frequency excitation and providing in response to such excitation mechanical motion at a predetermined high frequency to said assembly;
    an input end of said transducer assembly constituting a coupling means extending from said housing and adapted to be removably coupled to a machine tool for receiving rotary motion therefrom; said coupling means forming the sole support for holding said adapter to and in operative relation with the machine tool;
    an output end of said transducer assembly disposed opposite said input end constituting a tool-receiving means and adapted to receive a tool bit extending from said housing, said output end adapted to undergo rotational and oscillatory axial motion responsive to rotary motion applied at said input end and said excitation applied to said transducer assembly, and
    bearing means disposed between said transducer assembly and said housing for enabling said transducer assembly to undergo rotary motion relative to said housing.

2. An ultrasonic motion adapter as set forth in claim 1, an electrical brush assembly supported by said housing; an electrical slipring assembly coupled to said transducer assembly, and said brush assembly being in cooperating relation with said slipring assembly for providing electrical excitation generated exterior of said housing to said electroacoustic transducing means.

3. An ultrasonic motion adapter as set forth in claim 2, said transducer assembly including one elongate member dimensioned to oscillate in axial direction substantially as a half wavelength resonator responsive to said excitation.

4. An ultrasonic motion adapter comprising:
    a housing;
    a metallic shaft having an input end extending from said housing for causing said adapter to be removably couplable to and supportable by the spindle of a machine tool;
    a metallic sleeve disposed concentric with said shaft and radially spaced therefrom;
    said sleeve being dimensioned to undergo high-frequency axial vibrations and be resonant as a half wavelength resonator at the frequency of sound traveling longitudinally through said sleeve, said sleeve when resonant exhibiting a pair of antinodal regions of longitudinal motion;
    piezoelectric means adapted to be excited with electrical energy of predetermined high frequency coupled to said sleeve for causing said sleeve to be resonant;
    a pair of radial metallic flanges adapted to undergo flexural motion, a respective flange disposed at each of said antinodal regions and coupling said shaft to said sleeve whereby to support said sleeve about said shaft and said flanges restricting movement of said sleeve when resonant to motion principally along the longitudinal axis;
    tool-receiving means disposed on said sleeve for causing a tool coupled to said receiving means to undergo rotation responsive to rotating motion imparted to said shaft and undergo axial vibration responsive to the vibratory motion of said sleeve;
    an electrical slipring assembly coupled mechanically to said shaft and sleeve and electrically coupled to said piezoelectric means for providing electrical excitation to said piezoelectric means when said shaft and sleeve are rotating;
    means locking said shaft to said sleeve for transmitting axial thrust from said shaft to said sleeve;
    an electrical brush assembly coupled to said housing and disposed in cooperative relation with said slipring assembly;
    antifriction bearing means disposed between said shaft and said housing, and
    electrical connection means disposed for providing electrical energy from outside said housing through said housing to said electrical brush assembly.

5. An ultrasonic motion adapter as set forth in claim 4, said sleeve having an input portion which is fitted with said piezoelectric means and an output portion fitted with said tool-receiving means, and said output portion being of reduced diameter.

6. A machine tool assembly comprising in combination:
    A. a machine tool having a spindle adapted to rotate;
    B. an ultrasonic motion adapter for said tool comprising:
       B-1. a housing enclosing an electromechanical transducer assembly having electroacoustic transducing means for receiving electrical high-frequency excitation and providing in response to such excitation mechanical motion at an ultrasonic frequency to said assembly;
       B-2. an input end of said transducer assembly constituting a coupling means extending from said housing and adapted to be removably coupled to said spindle of said machine tool for receiving rotary motion therefrom, said coupling means forming the sole support for holding said adapter to and in operative relation with said machine tool;
       B-3. an output end of said transducer assembly disposed opposite said input end constituting a tool receiving means and adapted to receive a tool bit extending from said housing, said output end adapted to undergo rotational and oscillatory axial motion responsive to rotary motion applied at said input end and said excitation applied to said transducing means, and
       B-4. bearing means disposed between said transducer assembly and said housing for enabling said transducer assembly to undergo rotary motion relative to said housing.